United States Patent

Jeon

(10) Patent No.: US 7,360,818 B1
(45) Date of Patent: Apr. 22, 2008

(54) STRUCTURE OF AUXILIARY TAIL GATE OF VEHICLE

(75) Inventor: Dong-Min Jeon, Hwaseong-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 0 days.

(21) Appl. No.: 11/646,077

(22) Filed: Dec. 26, 2006

(30) Foreign Application Priority Data

Sep. 26, 2006 (KR) .................... 10-2006-0096045

(51) Int. Cl.
*B60R 7/02* (2006.01)
*B60P 1/273* (2006.01)

(52) U.S. Cl. .................... 296/51; 296/37.13; 296/37.6; 296/37.16; 296/57.1

(58) Field of Classification Search ............... 296/37.1, 296/37.6, 37.8, 37.13, 37.16, 50, 51, 57.1, 296/146.8; 224/402, 404
See application file for complete search history.

(56) References Cited

U.S. PATENT DOCUMENTS

| | | | | |
|---|---|---|---|---|
| 2,082,181 | A | * | 6/1937 | Pressnall .................... 224/280 |
| 5,215,346 | A | * | 6/1993 | Reitzloff et al. ............... 296/51 |
| 5,518,158 | A | * | 5/1996 | Matlack ....................... 224/402 |
| 5,702,144 | A | * | 12/1997 | Matsuura et al. ......... 296/37.13 |
| 5,853,116 | A | * | 12/1998 | Schreiner .................... 224/404 |
| 6,174,012 | B1 | | 1/2001 | Saffold |
| 6,196,605 | B1 | * | 3/2001 | Baldas et al. ............. 296/37.13 |
| 6,199,930 | B1 | * | 3/2001 | Riley ......................... 296/37.6 |
| 6,502,885 | B1 | * | 1/2003 | Gammon et al. ......... 296/37.13 |
| 6,811,067 | B2 | * | 11/2004 | Muizelaar et al. .......... 224/404 |
| 6,843,519 | B2 | * | 1/2005 | Ojanen ......................... 296/50 |
| 6,874,839 | B2 | * | 4/2005 | Acker et al. ................ 296/57.1 |
| 6,932,420 | B1 | * | 8/2005 | Donahue ................. 296/180.5 |
| 2002/0109369 | A1 | * | 8/2002 | Boomhower et al. .......... 296/63 |
| 2006/0152029 | A1 | * | 7/2006 | Tomasson et al. ............. 296/51 |
| 2007/0090662 | A1 | * | 4/2007 | Katterloher et al. ........ 296/57.1 |

FOREIGN PATENT DOCUMENTS

| | | |
|---|---|---|
| JP | 9099742 | 4/1997 |
| JP | 2001334879 | 12/2001 |
| JP | 2004189162 | 8/2004 |

* cited by examiner

*Primary Examiner*—Christopher P. Ellis
*Assistant Examiner*—Greg Blankenship
(74) *Attorney, Agent, or Firm*—Morgan Lewis & Bockius LLP

(57) ABSTRACT

A structure of an auxiliary tail gate, to open and close a main cargo area when it is impossible to provide enough space to move a main tail gate because another vehicle or obstacle is parked or placed near, and to store small cargo separately from the main cargo area. The auxiliary tail gate is rotatably disposed to the main tail gate by a hinge so as to open and close the main cargo area, an upper trim and a lower trim are attached to an inner panel of the main tail gate, and a trim door, disposed between the upper trim and the lower trim, defines an auxiliary cargo area between the trim door and an inner panel of the auxiliary tail gate, the trim door being detachably engaged with the upper trim and the lower trim.

4 Claims, 2 Drawing Sheets

STRUCTURE OF AUXILIARY TAIL GATE OF VEHICLE

CROSS-REFERENCE TO RELATED APPLICATIONS

The present application is based on, and claims priority from, Korean Application Serial Number 10-2006-0096045, filed on Sep. 29, 2006, the disclosure of which is hereby incorporated by reference herein in its entirety.

FIELD OF THE INVENTION

The present invention relates to a tail gate of a vehicle, and more particularly, to an auxiliary tail gate that allows opening and closing of the cargo area in the rear of a vehicle and allows small cargo to be stored separately from larger cargo.

BACKGROUND OF THE INVENTION

A conventional tail gate is rotatably installed to the upper part of the vehicle using two hinges. Gas lifts are installed on left and right sides, and the tail gate has a double panel structure in which an internal panel is bonded to an external panel, and at the lower side of a gate glass, a tail gate trim is fixedly attached to the internal panel to enhance the look of the inside of the vehicle. There may not be enough space to move the tail gate if another vehicle or obstacle is adjacent to it.

SUMMARY OF THE INVENTION

Embodiments of the present invention provide an auxiliary tail gate, to open and close a main cargo area when it is impossible to provide enough space to move a main tail gate because another vehicle is parked adjacent to it or some other obstacle is placed near, and to store small cargo separately from the main cargo area.

A structure of an auxiliary tail gate according to an embodiment of the present invention comprises an auxiliary tail gate rotatably disposed to a main tail gate. An upper trim and a lower trim are attached to an inner panel of the main tail gate. A trim door is disposed between the upper trim and the lower trim and defines an auxiliary cargo area between the trim door and the inner panel of the auxiliary tail gate. The trim door is detachably engaged with the upper trim and the lower trim.

The trim door may have a box shape and a plurality of leaf springs. Engaging grooves may be provided on the top surface of the upper trim and on the bottom surface of the lower trim. Engaging protrusions may be provided at upper and lower front ends of the trim door, such that the trim door is engaged with the upper trim and the lower trim, and a grip may be provided at a corner of the trim door.

An outside trim may be attached to the inner panel of the auxiliary tail gate facing the trim door so as to cover an opening of the trim door.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
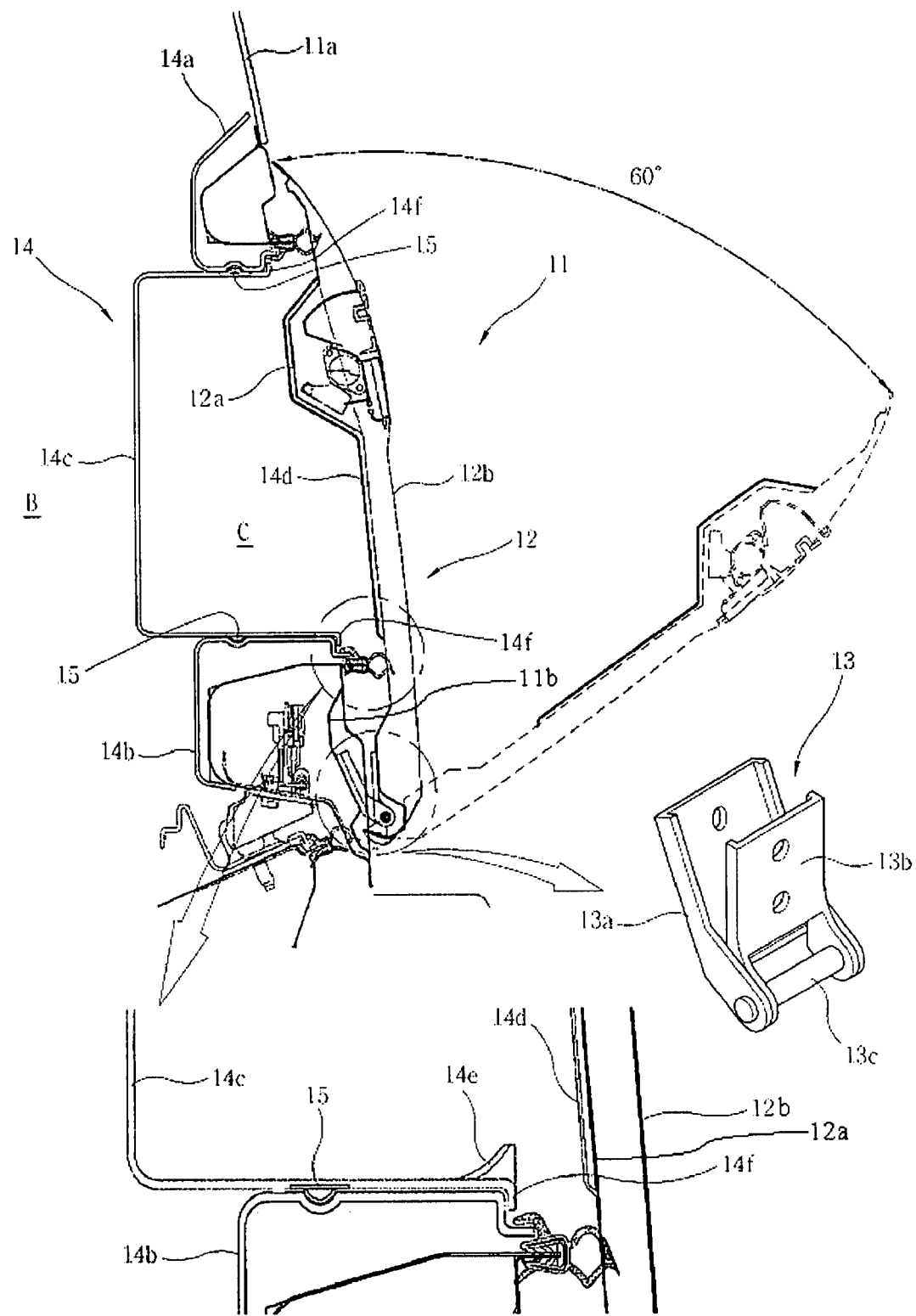
FIG. 1 is a cross-sectional view of a tail gate of a vehicle according to an embodiment of the present invention.

At a lower side of a main tail gate 11 having a gate glass 11a, an auxiliary tail gate 12 is provided to main tail gate 11 so as to pivot around a hinge 13 with respect to the main tail gate 11. Auxiliary tail gate 12 has a double panel structure in which an inner panel 12a and an outer panel 12b are bonded to each other.

Hinge 13 includes a first hinge bracket 13a, a second hinge bracket 13b and a hinge pin 13c. First hinge bracket 13a is attached to an inner panel 11b of main tail gate 11, and the second hinge bracket 13b is attached to inner panel 12a of auxiliary tail gate 12. Hinge pin 13c connects first and second hinge brackets 13a and 13b at the lower end thereof such that first and second hinge brackets 13a and 13b relatively pivot. Therefore, auxiliary tail gate 12 relatively pivots about the hinge pin 13c with respect to main tail gate 11 when the auxiliary gate 12 is opened, thus, auxiliary tail gate 12 opens a cargo area B independently from the main tail gate 11.

A trim 14 is attached to main tail gate 11 to enhance the look of the inside of main tail gate 11. Trim 14 includes an upper trim 14a, a lower trim 14b, a trim door 14c, and an outside trim 14d. Upper trim 14a is disposed adjacent to gate glass 11a and attached to the main tail gate 11. Lower trim 14b is attached to the lower part of main tail gate 11. Trim door 14c is disposed between the upper and lower trims 14a, 14b so as to be detachable from main tail gate 11 by two upper and lower leaf springs 15 on the bottom surface of the upper trim 14a and on the top surface of the lower trim 14b. Outside trim 14d covers an opening of the trim door 14c that is attached to inner panel 12a of the auxiliary tail gate 12 facing the trim door 14c.

Figure 2:
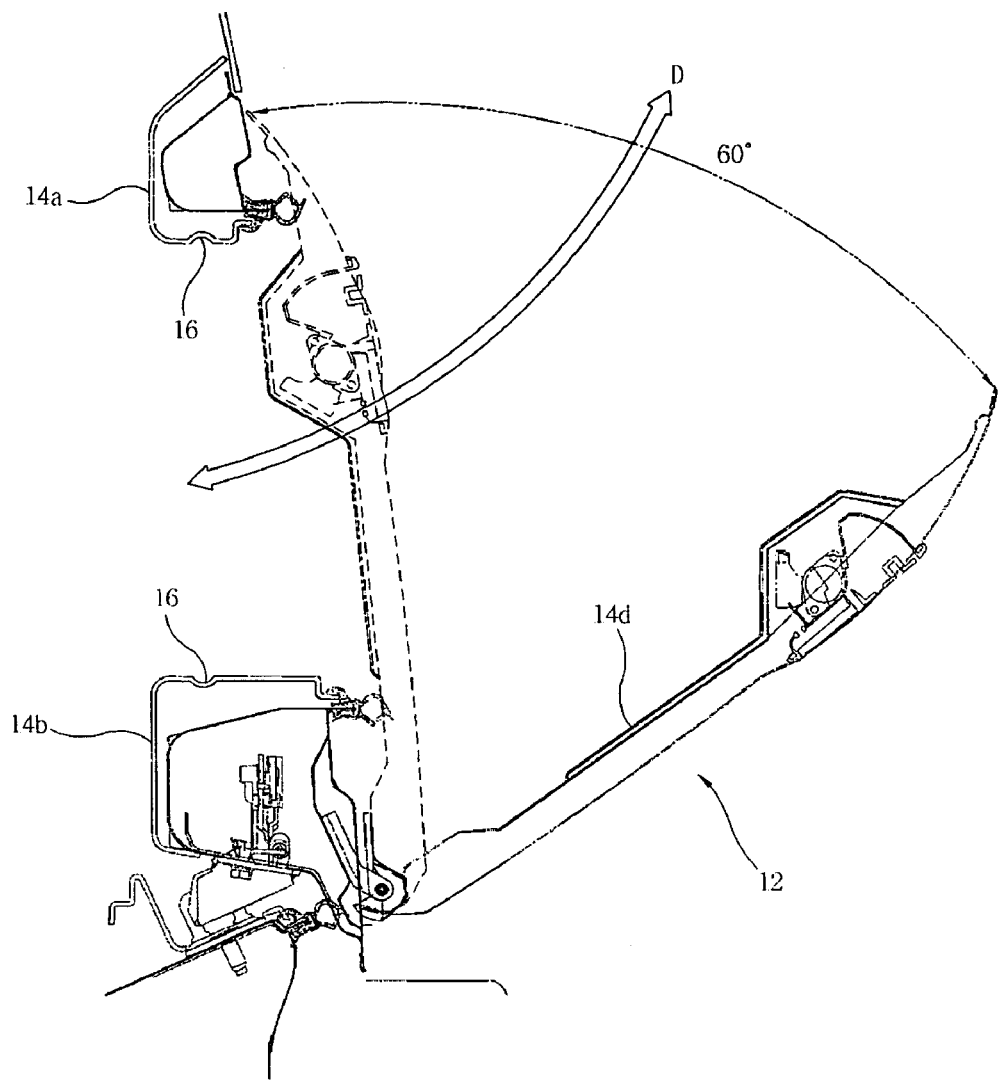
FIG. 2 is a cross-sectional view showing a state when the auxiliary gate and a trim door are opened according to an embodiment of the present invention.

Engaging grooves 16 are formed as shown in FIG. 2, such that leaf spring 15 of the trim door 14c is detachably engaged with the upper trim 14a and the lower trim 14b. A grip 14e is provided at a lower corner of the trim door 14c, to easily disengage trim door 14c from the upper trim 14a and the lower trim 14b when the auxiliary tail gate 12 is opened. Engaging protrusions 14f are formed at upper and lower front ends of the trim door 14c such that trim door 14c is reliably engaged with the upper trim 14a and the lower trim 14b.

Trim door 14c is hollow, and has a box shape with an opening at one side thereof. An auxiliary cargo area C is formed between the one side of the trim door 14c and inner panel 12a of auxiliary tail gate 12 to store small cargo.

Accordingly, when the auxiliary tail gate 12 is opened, the auxiliary cargo area C is opened, which allows small cargo to be stored separately from the main cargo area B. Additionally, to load to or unload small cargo from the cargo area C is easy. The opening angle of the auxiliary tail gate 12 is illustrated as approximately 60 degrees, but the invention is not limited to any particular opening angle.

Referring to FIG. 2, if the auxiliary tail gate 12 is pulled backward, it rotates about hinge 13. Further, if the grip of trim door 14c is pulled backward, the trim door is disengaged from the engaging groove of the upper trim and the lower trim, thus opening the main cargo area B.

The main cargo area B can be opened by opening only the auxiliary tail gate and the trim door without opening the main tail gate, so that it is possible to load and unload cargo in the direction of arrow D shown in FIG. 2.

According to embodiments of the present invention, when it is impossible to provide enough space to move the main tail gate because an obstacle is placed near it, to load and unload cargo is easy by opening only the auxiliary tail gate and the trim door without opening the main tail gate. In addition, an auxiliary cargo area is formed between the trim door and the auxiliary tail gate, which expands the cargo areas but also allows small cargo. In addition, it is possible to easily load and unload small cargo that should be stored separately from other cargo stored in the main cargo area.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A structure of an auxiliary tail gate of a vehicle, the auxiliary tail gate being rotatably attached to a main tail gate, the structure comprising:
    an upper trim and a lower trim both attached to an inner panel of the main tail gate; and
    a trim door disposed between the upper trim and the lower trim and defining an auxiliary cargo area between the trim door and the auxiliary tail gate, the trim door being detachably engaged with the upper trim and the lower trim,
    wherein a first end of the main tail gate is hinged to the vehicle to be opened and closed pivotally and the auxiliary tail gate is hinged to the main tailgate near a second end of the main tail gate to be opened and closed pivotally.

2. The structure as defined in claim 1, further comprising:
    at least one leaf spring attached to the trim door;
    at least one engaging groove on at least one of the upper trim and the lower trim; and
    at least one engaging protrusion on at least one of an upper and a lower front end of the trim door, such that the trim door is engaged with the upper trim and the lower trim.

3. The structure as defined in claim 1, further comprising an outside trim attached to the inner panel facing the trim door so as to cover an opening of the trim door.

4. The structure as defined in claim 1, further comprising a hinge comprising a first hinge bracket attached to the inner panel of the main tail gate, a second hinge bracket attached to an inner panel of the auxiliary tail gate, and a hinge pin connecting the first and second hinge brackets such that the first and second hinge brackets relatively pivot.

* * * * *